United States Patent
Darrah et al.

(10) Patent No.: US 10,063,907 B1
(45) Date of Patent: Aug. 28, 2018

(54) DIFFERENTIAL AUDIO-VIDEO SYNCHRONIZATION

(71) Applicant: Polycom, Inc., San Jose, CA (US)

(72) Inventors: James F. Darrah, Austin, TX (US); James E. Carter, Leander, TX (US)

(73) Assignee: Polycom, Inc., San Jose, CA (US)

( * ) Notice: Subject to any disclaimer, the term of this patent is extended or adjusted under 35 U.S.C. 154(b) by 0 days.

(21) Appl. No.: 15/615,717

(22) Filed: Jun. 6, 2017

(51) Int. Cl.
*H04N 9/475* (2006.01)
*H04N 21/43* (2011.01)
*H04N 21/44* (2011.01)

(52) U.S. Cl.
CPC ... *H04N 21/4307* (2013.01); *H04N 21/44008* (2013.01); *H04N 21/4302* (2013.01)

(58) Field of Classification Search
CPC ......... H04N 21/4307; H04N 21/44008; H04N 21/4302
USPC ....................................................... 348/512
See application file for complete search history.

(56) References Cited

U.S. PATENT DOCUMENTS

| | | | | |
|---|---|---|---|---|
| 5,387,943 | A | * 2/1995 | Silver | H04N 5/04 348/512 |
| 5,572,261 | A | * 11/1996 | Cooper | H04N 17/00 348/512 |
| 5,594,660 | A | * 1/1997 | Sung | G09G 5/393 375/E7.093 |
| 5,668,601 | A | * 9/1997 | Okada | H04N 21/4307 370/503 |
| 5,751,694 | A | * 5/1998 | Toft | H04J 3/18 348/14.08 |
| 2014/0250482 | A1 | * 9/2014 | Gifford | H04N 21/2187 725/116 |

* cited by examiner

*Primary Examiner* — Michael Lee
(74) *Attorney, Agent, or Firm* — Blank Rome, LLP (57) ABSTRACT

Techniques of audio-video synchronization that can be performed on audio and video streams are described. In one scenario, a processor can receive audio-video information comprising a video stream and an audio stream. Each of the video and audio streams can include one or more of: a compressed stream; and a decoded stream. A region of motion in the video stream can be determined based on a property of the video stream. A video signal can be generated based on the determined region of motion. Also, a relative delay between the streams can be determined based, at least in part, on the generated video signal. A delay value associated with one or more of the audio and video streams may be adjusted to assist with synchronizing the audio and video streams.

22 Claims, 6 Drawing Sheets

DIFFERENTIAL AUDIO-VIDEO SYNCHRONIZATION

TECHNICAL FIELD

The present disclosure relates generally to multimedia communication, and specifically to techniques of audio-video synchronization.

BACKGROUND

Audio-video synchronization refers to the relative temporal alignment of audio streams (i.e., sound) and video streams (i.e., images and/or content) during creation, post-production (mixing), transmission, reception, and play-back processing. Audio-video synchronization techniques may be used in television, videoconferencing, or film because audio-video synchronization can affect a person's perceived quality of media containing audio and video data. Audio-video synchronization techniques may consume large amounts of computational resources to be operationally effective. Consequently, some possible audio-video synchronization techniques remain sub-optimal.

BRIEF DESCRIPTION OF THE DRAWINGS

Embodiments described herein are illustrated by way of example and not limitation in the figures of the accompanying drawings, in which like references indicate similar features. It should be understood that the full scope of the inventions disclosed herein are not limited to the precise arrangements, dimensions, and instruments shown. Furthermore, in the drawings, some conventional details have been omitted so as not to obscure the inventive concepts described herein.

DETAILED DESCRIPTION

Reference to the drawings illustrating various views of exemplary embodiments is now made. In the following description, numerous specific details are set forth, such as specific configurations, methods, etc., in order to provide a thorough understanding of the embodiments. At least one of the described embodiments may be practiced without one or more of these specific details, or in combination with other known methods and configurations. In other instances, well-known processes and techniques have not been described in particular detail to avoid obscuring the embodiments. Reference throughout this specification to "one embodiment," "an embodiment," "another embodiment," "other embodiments," "some embodiments," and their variations means that a particular feature, structure, configuration, or characteristic described in connection with the embodiment is included in at least one implementation. Thus, the appearances of the phrase "in one embodiment," "in an embodiment," "in another embodiment," "in other embodiments," "in some embodiments," or their variations in various places throughout this specification are not necessarily referring to the same embodiment. Furthermore, the particular features, structures, configurations, or characteristics may be combined in any suitable manner in one or more embodiments. In the drawings and the description of the drawings herein, certain terminology is used for convenience only and is not to be taken as limiting the embodiments of the present disclosure. Furthermore, in the drawings and the description below, like numerals indicate like elements throughout.

In the following description and claims, the terms "coupled" and "connected," along with their derivatives, may be used. It should be understood that these terms are not intended as synonyms for each other. "Coupled" is used to indicate that two or more elements or components, which may or may not be in direct physical or electrical contact with each other, co-operate or interact with each other. "Connected" is used to indicate the establishment of communication between two or more elements or components that are coupled with each other.

Any marks that have been referenced herein may be common law or registered trademarks of third parties affiliated or unaffiliated with the applicant or the assignee. Use of these marks is by way of example and shall not be construed as descriptive or to limit the scope of the embodiments described herein to material associated only with such marks.

As used herein, "audio-video information" and its variations refer collectively to data (e.g., signals, streams, metadata, etc.) representing sound and video (i.e., images and/or content). For example, audio-video information can comprise an audio stream, a video stream, and metadata corresponding to one or more of the streams. In some instances, a first set of audio-video information can be processed to generate a second set of audio-video information. For example, an audio stream may be processed to generate an audio signal representing one or more properties of the audio stream. In other instances, a first set of audio-video information can be extrapolated from a second set of audio-video information.

As used herein, "a property of audio-video information," "a property of an audio stream," "a property of a video stream," "a property of an audio signal," "a property of a video signal," and their variations refer to a characteristic describing sound and/or video. For one example, a property of an audio stream can include a density vector, a size of a segment of the audio stream, a frequency of a segment of the audio stream, loudness associated with a segment of the audio stream, an acoustic property associated with a segment of the audio stream, etc. For another example, a property of a video stream can include a motion vector, a size of a segment of the video stream, a frequency of a segment of the video stream, brightness associated with a segment of the video stream, contrast associated with a segment of the video stream, saturation associated with a segment of the video stream, a video property associated with a segment of the video stream, etc.

As used herein, "motion," "a region of motion," and their variations refer to a relative positional difference of an object or a point found in two or more frames of a video sequence that exceeds a threshold difference. For one example, a region of motion exists between two frames when a position of an object in a first one of the frames is located within a predetermined distance of a position of the object in a second one of the frames (where the frames are captured at different times). As shown in the preceding examples, the region of motion can represent, among others, a change in scene or subject matter of the video stream. In some of the embodiments described herein, motion estimation (e.g., motion vectors, etc.) can be used for determining a region of motion in a video stream.

As used herein, "relative delay" and its variations refer to a time relationship between a video event, such as a mouth pattern associated with creation of a sound, and an occurrence of the sound in the audio. The relative delay can be used to delay one or both of the video and signals.

Audio-video synchronization techniques can require large amounts of computational resources to be operationally effective. Such resources include, but are not limited to, processing power for decoding the audio and video data; processing power for performing analysis associated with establishing audio-video synchronization of the audio and video data; processing power required to resolve mislabeled packets; and memory required for storing data associated with the techniques.

An example of audio-video synchronization is an alignment of a relative temporal difference between a video of a person's lips and a sound produced by the person's voice. According to International Telecommunication Union Radiocommunication (ITU-R) Recommendation BT.1359-1, "Relative Timing of Sound and Vision for Broadcasting," a relative difference in the temporal alignment between audio and video is generally imperceptible to a broad class of persons when the audio precedes corresponding video by no more than 90 milliseconds or when the audio follows the corresponding video by no more than about 185 milliseconds. Consequently, video and audio streams may be synchronous with one another when audio precedes corresponding video by no more than 90 milliseconds or when the audio follows the corresponding video by no more than about 185 milliseconds. ITU-R Recommendation BT.1359-1 is hereby incorporated in its entirety by reference.

In many cases, video and audio streams may not be synchronous after the video and audio streams have been compressed into formats used for communicating the video and audio streams (e.g., packets, etc.). For example, analog video and audio signals may be converted into digital forms and processed by one or more encoding techniques into video and audio streams. These encoding techniques may reduce the bit rate or bandwidth used to transmit the streams. In another scenario, decoding encoded audio and/or video streams can also cause resulting audio and video to be mismatched (i.e., not synchronized). Additionally, mismatched audio and video can also occur when images from multiple video streams are combined or when multiple audio streams are mixed together. Audio and video may also fail to be synchronized when video and audio streams are distributed independently through different channels. These and other processes can introduce delays in the processing paths, which can result in mismatched audio and video.

One possible audio-video synchronization technique includes: (i) decoding compressed audio and video streams (e.g., packets, etc.) into a usable format; (ii) analyzing the decoded audio and video data by searching for matches between decoded audio and video data and reference audio and video data that is known to be synchronized; (ii) calculating a change in temporal alignment between the decoded audio and video data relative to the alignment between the reference audio and video data; and (iii) delaying at least one of the decoded audio and video data to establish synchronization between the decoded audio and video. This technique can be sub-optimal because it assumes that the reference audio and/or video data and the decoded audio and video data use a common clock or time format or comparable clock or time formats.

Another possible audio-video synchronization technique includes: (i) decoding compressed audio and video streams (e.g., packets, etc.) into a usable format; (ii) analyzing the decoded audio and video data in order to estimate the relative delay between audio and video data; and (ii) compensating for the estimated delay between the audio and video data to achieve synchronization. This technique may be sub-optimal because the estimated delay between the decoded audio and video data is computationally intensive to acquire and the estimated delay can be inaccurate (e.g., due to a fairly large error).

Yet another possible audio-video synchronization technique when the Real-Time Transport (RTP) protocol is used includes: (i) analyzing timestamps associated with the audio and video streams and using timing information carried in RTP Control Protocol (RTCP) Sender Reports to determine a relative delay between the streams; and (ii) adding additional playback delay to the stream with the least delay to achieve an acceptable audio-video synchronization for the audio and video data. IETF RFC 3550 "RTP: A Transport Protocol for Real-Time Applications" is hereby incorporated in its entirety by reference. This technique may depend on accuracy of timestamps included in the audio and video streams and reception of accurate RTCP timing information. If RTCP Sender Reports are not available or ignored, the receiver might alternatively assume that the corresponding audio and video packets were sent at the same time (even though RTP does not require this). This assumption, however, may be inaccurate—especially when the audio and video are processed by servers in between the original source and the receiver. For example, corresponding audio and video may not have been sent at the same time, may not arrive at the same time, may not arrive at all, and streams may be incorrectly time stamped. In addition, the RTCP timing information may not be accurate or may not reach the receiver at all.

Embodiments of this disclosure pertain to techniques of audio-video synchronization that can assist with improving computer functionality. For example, one or more embodiments described herein may enable audio-video synchronization techniques that require relatively fewer computational resources than one or more of the audio-video synchronization techniques described above. Further, one or more embodiments described herein may enable audio-video synchronization techniques that rely on information other than time stamps and may therefore be relatively more accurate when incorrect or imprecise timestamps are received. Further, one or more embodiments described herein may enable audio-video synchronization techniques without having to decode received audio and/or video streams and may therefore consume relatively fewer computational resources, as compared to the audio-video synchronization techniques described above.

Figure 1A:
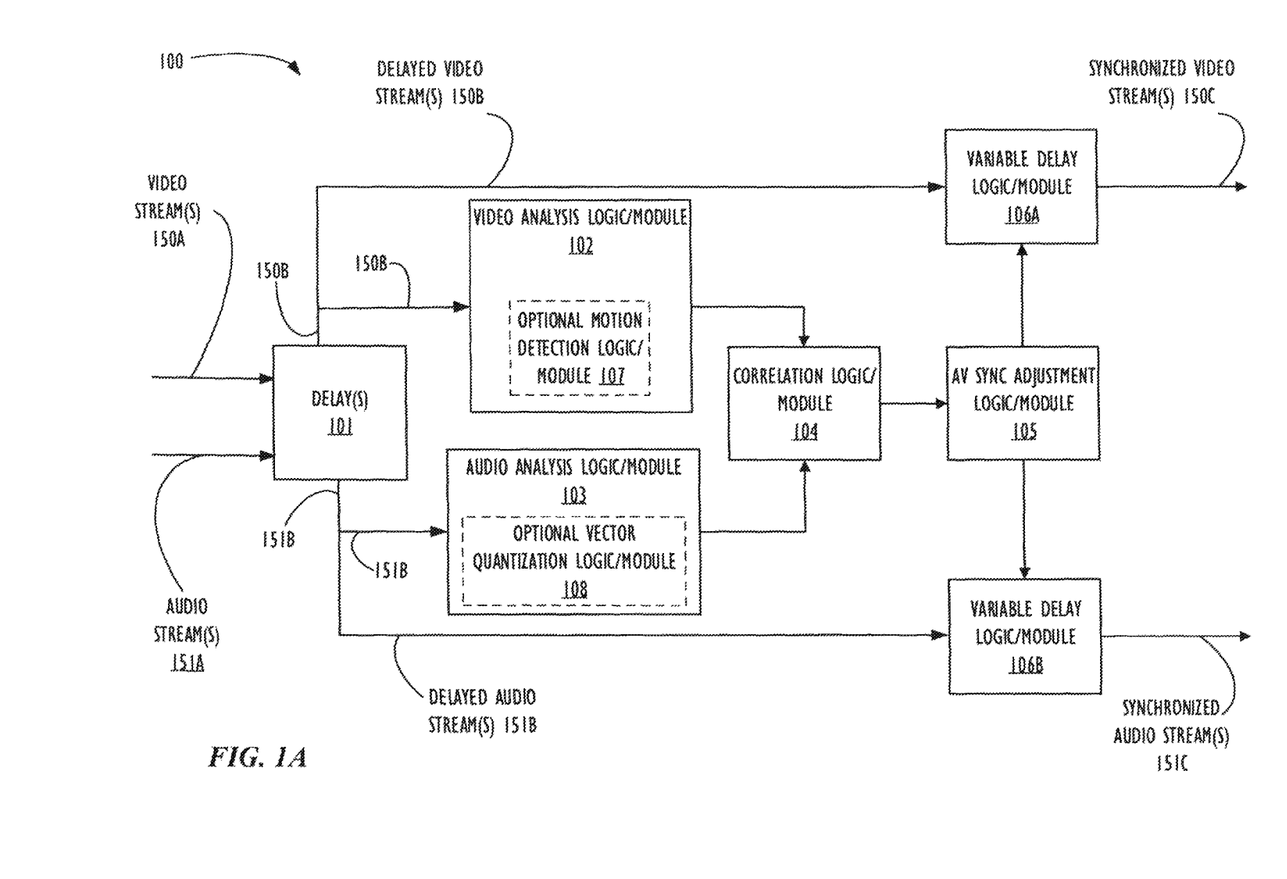
FIG. 1A is a schematic block diagram of an exemplary system for audio-video synchronization between video and audio streams in accord with an embodiment.

FIG. 1A is a schematic block diagram of an exemplary computer system 100 that can assist with establishing audio-video synchronization between video and audio streams. As used herein, the term "a computer system" can refer to a single computing device or to a plurality of computing devices working together to perform a function or an operation. In one embodiment of a computer system comprised of multiple computing devices, one or more of the devices can perform at least one function or at least one operation that is different from one or more functions or operations that are performed by one or more other devices of the system. For one example, a first device of a computer system can perform a first function or operation that differs from a second function or operation performed by a second device of the computer system. For another embodiment of a computer system comprised of multiple computing devices, one or more of the devices can have at least one function or at least one operation performed on it that is different from one or more functions or operations that are performed on one or more other devices of the system. For example, a first device of a computer system can have a first function or operation performed on it that differs from a second function or operation that is performed on a second device of the computer system. The system 100 can be included in an endpoint, a conference controlling entity (e.g., a multipoint control unit (MCU), etc.), a multimedia server, a television capable of receiving and/or transmitting audio and video streams, or any other electronic device capable of receiving and/or transmitting audio and video streams.

The system 100 can be implemented as a single computing device, such as a computing device 300 that is described below in connection with FIG. 3. As used herein, the term "computing device" and its variations refer to a physical object that includes electronic components configured to receive, transmit, and/or process data information. In one embodiment, one or more of the electronic components may be embedded within a physical object, such as in wearable devices and mobile devices (e.g., self-driving vehicles). In one embodiment, the computing device may also include actuators, motors, control functions, sensors, and/or other components to perform one or more tasks. For example, the computing device may correspond to a drone, a self-driving vehicle, and/or an automated transporter. In other examples, the computing device may correspond to a mobile computing device, a lap top computer, a wearable computing device, a network device, an internet of things (IoT) device, a cloud computing device, a vehicle, a smart lock, etc.

The computer system 100 can be implemented by a plurality of computing devices, such as a plurality of computing devices that are interconnected via one or more networks. As used herein, a "network," and their variations refer to a plurality of interconnected computing devices that can exchange data with each other. For example, a computer network can enable a computer system comprised of interconnected computing devices to communicate with each other. Examples of computer networks include, but are not limited to, a peer-to-peer network, any type of data network such as a local area network (LAN), a wide area network (WAN) such as the Internet, a fiber network, a storage network, or a combination thereof, wired or wireless. In a computer network, interconnected computing devices exchange data with each other using a communication mechanism, which refers to one or more facilities that allow communication between devices in the network. The connections between interconnected computing devices are established using wired and/or wireless communication links. The communication mechanisms also include networking hardware (e.g., switches, gateways, routers, network bridges, modems, wireless access points, networking cables, line drivers, switches, hubs, repeaters, etc.)

In one embodiment, the computer system 100 is implemented as at least one of hardware (e.g., electronic circuitry of processing unit(s), dedicated logic, etc.), software (e.g., one or more instructions associated with a computer program executed by the processing unit(s), software run on a general-purpose computer system or a dedicated machine, etc.), or a combination thereof. In one embodiment, the system 100 performs one or more embodiments of techniques for audio-video synchronization, as described herein. For an example of this embodiment, each of logic/modules 102-106B in the system 100 is implemented using hardware, software, or a combination thereof.

FIG. 1A includes one or more video streams 150A and one or more audio streams 151A. In one embodiment, the video streams 150A comprise one or more: (i) at least one compressed video stream; and (ii) at least one decoded video stream. In one embodiment, the audio streams 151A comprise one or more: (i) at least one compressed audio stream; and (ii) at least one decoded audio stream. As used herein, a "compressed stream," an "encoded stream," and their variations refer to a stream of data that has been compressed or encoded according to a compression technique. For one example, a compressed video stream refers to a stream of video data that has been compressed according to a video compression standard. For another example, a compressed audio stream refers to a stream of audio data that has been compressed according to an audio compression standard. As used herein, a "decoded stream," a "de-compressed stream," and their variations refer to a stream of data that has been decoded or de-compressed from its encoded or compressed state according to a decoding technique. For one example, a decoded video stream refers to a stream of video data that has been de-compressed from its compressed state according to a video compression standard. For another example, a decoded audio stream refers to a stream of audio data that has been de-compressed from its compressed state according to an audio compression standard. The video streams 150A and the audio streams 151A can originate from at least one source (e.g., an endpoint, an MCU, a multimedia server, etc.). Also, the streams 150A and 151A may or may not be synchronized. The processing operations required to convert received audio and video data into compressed audio and video streams may introduce delays such that the audio and video data (in the compressed state) is no longer in sync. Also, the processing operations required to convert compressed audio and video data into decoded audio and video streams may introduce delays such that the audio and video data (in the decoded state) is no longer in sync.

The streams 150A and 151A may be formatted according to a variety of communication protocols and compression standards. The video stream(s) 150A can, for example, be compressed using one or more video compression techniques (e.g., spatial image compression, temporal motion compensation, etc.). Standards for video compression include, but are not limited to, H.120, H.261, MPEG-1 Part 2, H.362/MPEG-2 Part 2, H.263, MPEG-4 Part 2, H.364/MPEG-4 AVC, VC-2 (Dirac), H.265, etc. With regard to the audio stream(s) 151A, techniques of compressing audio include, but are not limited to, lossy audio compression techniques and lossless audio compression techniques. Standards for audio compression include, but are not limited to, AAC, AC-3, ALAC, ALS, AMBE, AMR, AMR-WB, AMR-WB+, apt-X, ATRAC, BroadVoice (BV16, BV32), CELT, Codec2, Enhanced AC-3, FLAC, G.711, G.722, G.722.1, G.722.2, G.723.1, G.726, G.728, G.729, GSM-FR, HE-AAC, iLBC, iSAC, Monkey's Audio, MP2 (MPEG-1, 2 Audio Layer II), MP3, Musepack, Nellymoser Asao, Opus, SBC, Shorten, SILK, Siren 7, Speex, SVOPC, True Audio (TTA), TwinVQ, Vorbis, WavPack, and Windows Media Audio.

The communication of the streams 150A and 151A can be based on communication protocols, such as, but not limited to, H.323 or Session Initiation Protocol (SIP). In some scenarios, the streams 150A and 151A can be based on the Real-time Transport Protocol (RTP), which is described in RFC 3550. In this scenario, the streams 150A and 151A are communicated in the form of packets. An RTP packet generally includes a payload that includes data (e.g., audio, video, content, etc.) and a header that includes metadata for the communication and/or the data in the payload. Timestamps can be included the RTP header of media packets by one or more processing units. In order to synchronize between the audio streams and the video streams, the timestamps in the RTP packets can be compared by one or more processing units. Here, the timestamps may reflect the capture time of the audio by an input device (e.g., a microphone, etc.) and/or the capture time of the video by an input device (e.g., a camera, etc.). In spite of these timestamps, the streams 150A and 151A may be delayed 101. Delays 101 can occur regardless of the communication protocol or mechanism used for communicating the streams 150A and 151A. The delays 101 can also occur regardless of whether the streams 150A and 151A include at least one compressed stream or at least one decoded stream. The delays 101 can, for example, be due to communication of the streams 150A and 151A over one or more networks. Networks might not facilitate communication of the streams 150A and 151A as expected because of bottlenecks, bandwidth issues, congestion, and traffic. Additionally, when one or more portions of such networks become faulty, this could place strain on the network nodes, which can in turn cause the network to operate improperly. The delays 101 can also be due to processing operations performed on the streams 150A and 151A. For example, the delays 101 can be introduced by a stream processing architecture, in which frames from a continuous stream are processed one (or more) at a time. This type of processing may be used for processing live media (e.g., audio, data, video data, etc.) or for processing media when the media cannot be processed efficiently all at once because of the media's size. As a result of the delays 101, the streams 150A and 151A may become unsynchronized, which results in delayed streams 150B and 151B.

Figure 1B:
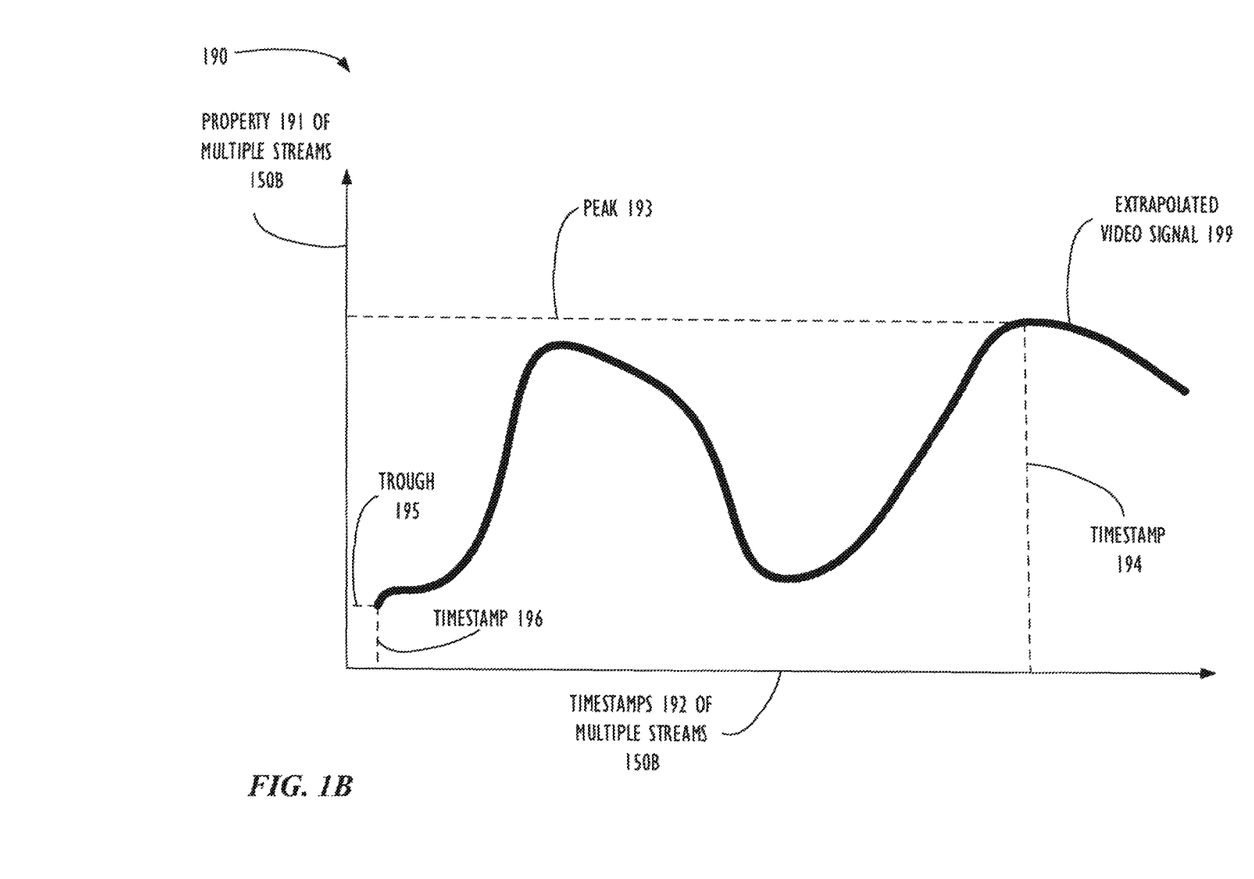
FIG. 1B is a graphical diagram of an exemplary extrapolated video signal that can assist with establishing audio-video synchronization between video and audio streams in accord with an embodiment.

In one embodiment, the delayed streams 150B and 151B are transmitted to a video analysis logic/module 102 (hereinafter "analysis logic/module 102") and an audio analysis logic/module 103 (hereinafter "analysis logic/module 103"), respectively. With regard to the delayed video stream(s) 150B, the analysis logic/module 102 is used to extrapolate a signal from the delayed video stream(s) 150B. This signal can, for one embodiment, represent a degree of change in a property associated with the delayed video stream(s) 150B. This signal is referred herein to as an extrapolated video signal. FIG. 1B illustrates a graphical representation 190 of an extrapolated video signal 199 that may be extrapolated from multiple streams 150B by the analysis logic/module 102 of FIG. 1. Here, the extrapolated video signal 199 represents a degree of change in properties 191 of the multiple streams of the delayed video stream(s) 150B. The properties 191 can include, but are not limited to, sizes of the streams 150B or values of motion vectors associated with the multiple streams of the delayed video stream(s) 150B. For example, the extrapolated video signal 199 is a function of sizes of the multiple streams of the delayed video stream(s) 150B and corresponding timestamps assigned to the multiple streams of the delayed video stream(s) 150B. This signal 199 may be useful for synchronization because the larger the data in the multiple streams of the delayed video stream(s) 150B, the more likely it is that motion is present in the captured video data. Based on this likelihood, the extrapolated video signal 199 will have a peak 193 that corresponds to the largest sized one of the multiple streams of the delayed video stream(s) 150B and a trough 195 that corresponds to the smallest sized one of the multiple streams of the delayed video stream(s) 150B. The peak 193 has a corresponding timestamp 194, which is a timestamp associated with the one stream of the streams 150B having the largest size. The trough 195 has a corresponding timestamp 196, which is a timestamp associated with the one stream of the streams 150B having the smallest size.

In one embodiment, the analysis logic/module 102 includes an optional motion detection logic/module 107 (shown in FIG. 1). Motion detection, as used herein, refers to one or more techniques of determining a motion vector for each of the one or more delayed video streams 150B. A motion vector can represent a macroblock in an image based on a position of this macroblock (or a similar one) in another image (e.g., a reference image). Motion vectors enable identification and organizing of the one or more delayed video streams 150B according to relative differences in motion within the one or more delayed video streams 150B. In one embodiment, the analysis logic/module 102 generates the extrapolated video signal 199 as a function of the values of determined motion vectors and the timestamps 192 that correspond to the streams 150. For example, and as shown in FIG. 1B, the analysis logic/module 102 extrapolates the signal 199 from the streams 150B. The extrapolated video signal 199 may be useful for audio-video synchronization because the higher the value of a motion vector, the more likely it is that motion is present in the captured video data. In view of this likelihood, the extrapolated video signal 199 will have a peak 193 that corresponds to the one stream of the stream(s) 150B having the most amount of change and a trough 195 that corresponds to the one stream of the stream(s) 150B having the least amount of change.

Figure 1C:
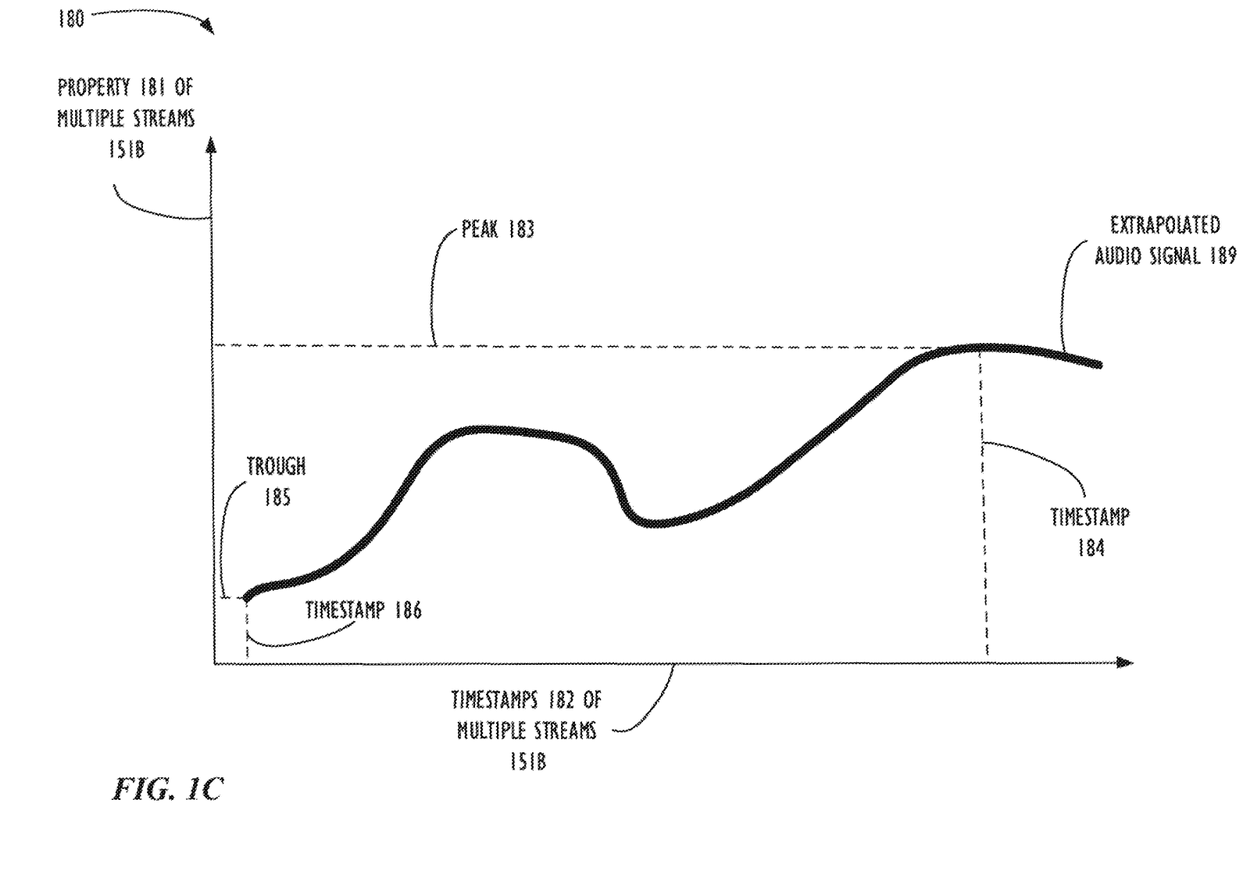
FIG. 1C is a graphical diagram of an exemplary extrapolated audio signal that can assist with establishing audio-video synchronization between video and audio streams in accord with an embodiment.

With regard again to FIG. 1A, the analysis logic/module 103 can extrapolate a signal from the delayed audio stream(s) 151B that represents a degree of change in a property associated with the delayed audio stream(s) 151B. This signal is referred to herein as an extrapolated audio signal. FIG. 1C, illustrates a graphical representation 180 of an extrapolated audio signal 189 that may be extrapolated from multiple streams 151B. Here, the extrapolated audio signal 189 represents a degree of change in properties (e.g., size, etc.) of the multiple streams 151B. Furthermore, the extrapolated audio signal 189 is a function of the properties of the streams 151B (e.g., sizes of streams 151B, etc.) and corresponding timestamps of the streams 151B. The signal 189 may assist with synchronization because the larger the size of an audio stream 151B, the more likely it is that audio (as opposed to silence or noise) is present in the captured audio data. Consequently, the extrapolated audio signal 189 will have a peak 183 that corresponds to the largest sized of one of the streams 151B and a trough 185 that corresponds to the smallest sized one of the streams 151B. The peak 183 corresponds to the timestamp 184, which is a timestamp associated with the largest sized one of the streams 151. The trough 185 corresponds to the timestamp 186, which is a timestamp associated with the smallest sized one of the streams 151.

In one embodiment, and with regard to FIG. 1A, the analysis logic/module 103 includes an optional vector quantization logic/module 108. Vector quantization, as used herein, refers to a signal processing technique for modeling probability density functions using one or more prototype vectors. The density matching property of vector quantization enables identification and organizing the delayed audio streams 151B according to relative densities of the data in the delayed audio streams 151B. In one embodiment, the relative densities are used for determining at least one density vector for each of the delayed audio streams 151B.

In one embodiment, and with regard to FIG. 1C, the analysis logic/module 103 generates the extrapolated audio signal 189 as a function of the values of determined density vectors and the timestamps 182 that correspond to the streams 151B. For example, the analysis logic/module 103 extrapolates a signal 189 from one or more streams 151B that represents one or more density vectors acquired from streams 151B. Furthermore, the extrapolated audio signal 199 is a function of the density vectors of streams 151B and their corresponding timestamps 182. The extrapolated audio signal 189 may assist with facilitating synchronization because the higher the value of a density vector, the more likely it is that audio (as opposed to silence or noise) is present in the captured audio data. Consequently, the extrapolated audio signal 199 will have a peak 183 that corresponds to the denser one of the streams 151B and a trough 185 that corresponds to the least dense one of the streams 151B.

Returning now to FIG. 1A, a correlation logic/module 104 may receive the outputs of the analysis logic/modules 102-103. In one embodiment, the correlation logic/module 104 maps the extrapolated video signal 199 onto the extrapolated audio signal 189 such that the peaks 183, 193 and/or troughs 185, 195 of the extrapolated audio and video signals 189, 199 are correlated with each other. In this way, the extrapolated audio and video signals are correlated with each other.

Figure 1D:
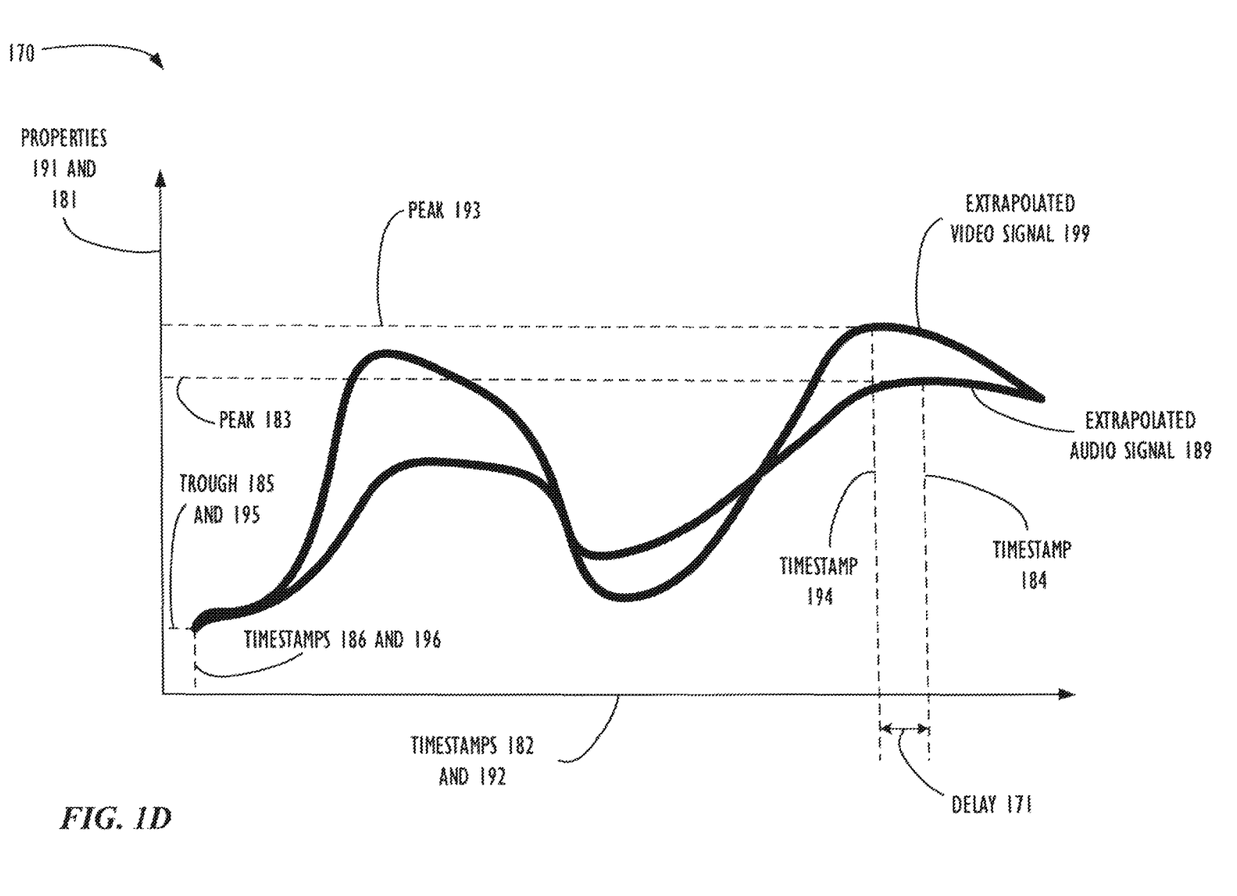
FIG. 1D is a graphical diagram of an exemplary mapping of extrapolated video and audio signals that can assist with audio-video synchronization between video and audio streams in accord with an embodiment.

FIG. 1D is a graphical representation 170 of an exemplary mapping of extrapolated audio signal 189 and extrapolated video signal 199 that can assist with establishing audio-video synchronization of video and audio streams 150B and 151B. As shown in FIG. 1D, the correlation logic/module 104 aligns the trough 185 of the extrapolated audio signal 189 with the trough 195 of the extrapolated video signal 199. Thus, the timestamps 186 and 196 of the troughs 185, 195 are matched up. In one embodiment, the correlation logic/module 104 determines a delay 171 for synchronizing the streams 150B and 151B based on the difference between the timestamps 184 and 194. In an alternate embodiment, the correlation logic/module 104 aligns the peak 183 of the extrapolated audio signal 189 with the peak 193 of the extrapolated video signal 199. In this alternate embodiment, the timestamps 184 and 194 of the peaks are matched up. Next, and for this alternate embodiment, the correlation logic/module 104 determines a delay (not shown in FIG. 1D) for synchronizing the streams 150B and 151B. The delay can be based on a difference between the timestamps 196 and 186. The embodiments described in this paragraph may be combined.

With regard again to FIG. 1, the correlation logic/module 104 can communicate the determined delay 171 to an audio-video synchronization adjustment logic/module 105, which in turn adjusts one or more of the variable delay logic/modules 106A-B to synchronize the streams 150B and 151B. In this way, the outputs of the variable delay logic/modules 106A-B become synchronized video streams 150C and 151C. In some scenarios, the synchronized video streams 150C and 151C can be provided to additional logic/modules (not shown) for further processing (e.g., synchronization via other techniques, etc.), communication, and/or presentation on output devices.

One advantage of the techniques performed by the system 100 is that the video and audio streams 150A-C, 151A-C can remain in a single state throughout the process—for example, in a compressed state, in a decoded state, etc. Consequently and for this example, additional computational resources are not required to decode or compress the streams 150A-B, 151A-B for synchronization. In this way, any device or system that can receive streams 150A-B, 151A-B in their compressed state or in their decoded state may be configured for synchronization in accordance with one or more of the embodiments described herein. In an exemplary videoconferencing system comprised of multiple endpoints and MCUs, each of the videoconferencing devices may be associated with or coupled to a corresponding computer system analogous to the computer system 100. In this way, there are multiple opportunities for synchronization in accordance with one or more of the embodiments described herein, which can assist with reducing the amount of computational resources that the videoconferencing system as (a whole) would have to expend on audio-video synchronization. Another advantage of the techniques performed by the system 100 is that video and audio streams 150A-C, 151A-C do not have to be in the same state to be synchronized. For a first example, one or more of the video streams 150A-C can be in a compressed state or a partially compressed state while one or more of the audio streams 151A-C are in a decoded state. For a second example, one or more of the video streams 150A-C can be in a decoded state while one or more of the audio streams 151A-C are in a compressed state or a partially compressed state. Consequently and for the immediately preceding examples, additional computational resources are not required to determine the states of the streams 150A-B, 151A-B or to convert the streams 150A-B, 151A-B into the same state for synchronization to occur. In this way, any device or system that can receive streams 150A-B, 151A-B in one or more states may be configured for synchronization in accordance with one or more of the embodiments described herein. Yet another advantage of the techniques performed by system 100 includes using a property of the streams 150A-B, 151A-B together with the streams' timestamps (e.g., timestamps 186, 196, etc.). This can assist with minimizing synchronization errors that occur due to streams' having incorrect timestamps. In one embodiment, the selected property (e.g., size, motion vectors, density vectors, etc.) correlates directly to motion and/or audio levels in the streams 150A-B, 151A-B. In this way, one or more of the synchronization techniques described herein can perform audio-video synchronization using fewer computational resources than at least one currently available synchronization technique.

Figure 2:
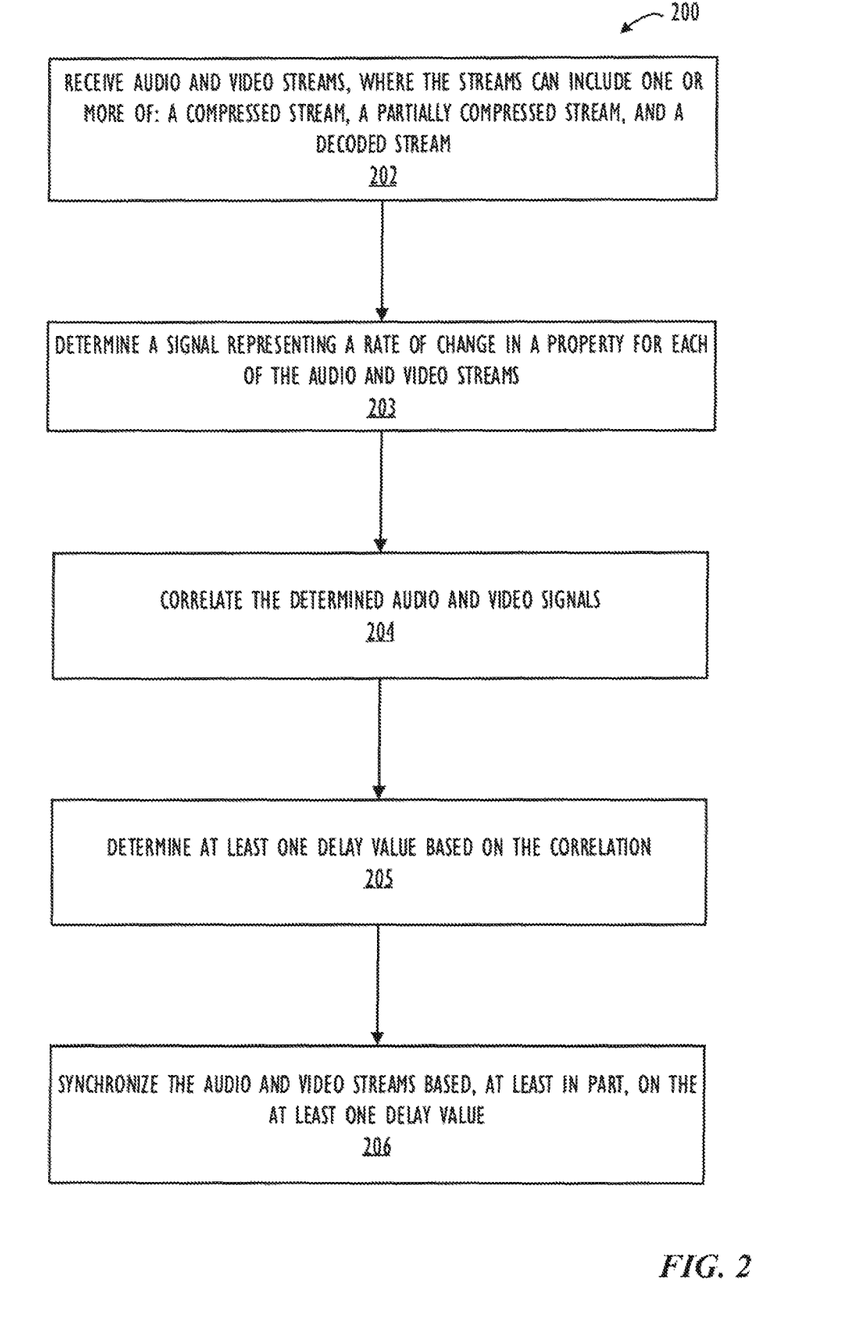
FIG. 2 is a flowchart of a method for establishing audio-video synchronization between video and audio streams in accord with an embodiment.

FIG. 2 is a flowchart illustrating a technique 200 for establishing audio-video synchronization between video and audio streams. In one embodiment, the system 100 described above in connection with FIG. 1 performs the technique 200. The technique 200 begins at operation 202, where the system performing the technique 200 receives audio and video streams. The received streams may include one or more of: (i) at least one compressed stream; and (ii) at least one decoded stream. The received streams may also include one or more partially compressed streams. Next, the technique 200 proceeds to operation 203. Here, the system performing the technique 200 determines a signal representing a rate of change in a property of the streams. In one embodiment, the determined signal is a function of the property's values and timestamps assigned to the streams. For video streams, the property can be sizes of the streams or motion vectors associated with the audio streams. For audio streams, the property can be sizes of the streams or density vectors associated with the audio streams. At operation 204, the system performing the technique 200 correlates the determined signals using the peaks and/or troughs of the signals. The technique 200 also includes operation 205, which includes determining at least one delay value based on the correlation. The technique 200 ends at operation 206, where the determined delay values are used to synchronize the audio and video streams. In one embodiment, each of operations 201-206 is performed in accordance with description provided above in connection with FIGS. 1A-1D.

Figure 3:
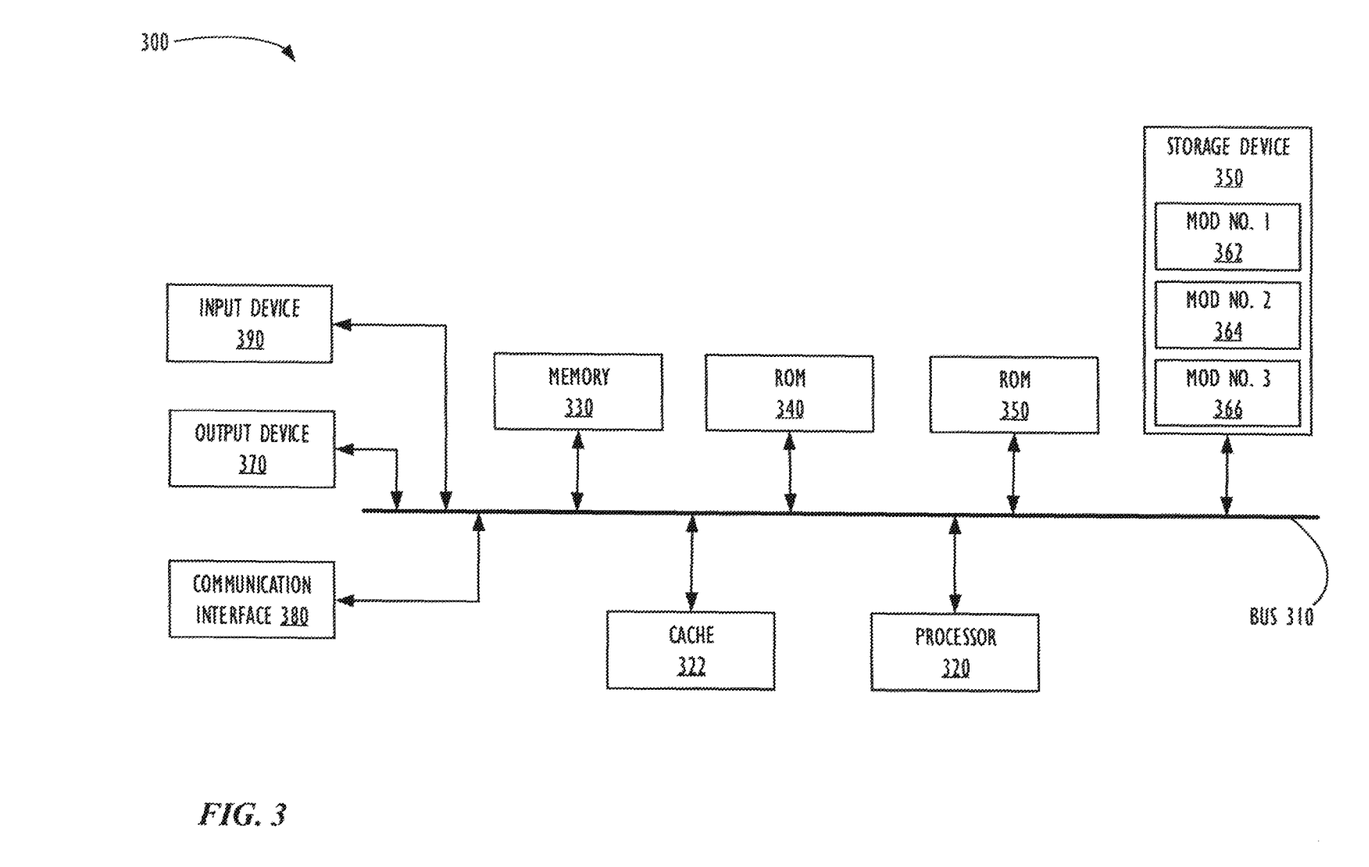
FIG. 3 illustrates a computing device operable to perform one or more methods disclosed herein.

FIG. 3 illustrates an exemplary computing device 300 operable with one or more of the embodiments disclosed herein. The components disclosed herein can be incorporated in whole or in part into tablet computers, personal computers, handsets, transmitters, servers, and any other electronic or other computing device. In a specific example, the computing device 300 can be part of the system 100 described above in connection with FIGS. 1A-2. As shown, the computing device 300 can include a processing unit 320 (e.g., a CPU, a GPU, any other type of processor, etc.) and a system bus 310 that couples various system components including system memory 330, read only memory (ROM) 340, and random access memory (RAM) 350 to the processor 320. The computing device 300 can include a cache 322 of high speed memory connected directly with, in close proximity to, or integrated as part of the processor 320. The computing device 300 copies data from the memory 330 and/or the storage device 360 to the cache 322 for quick access by the processor 320. In this way, the cache 322 may provide a performance boost by reducing delays associated with the processor 320 waiting for data. These and other modules can control or be configured to control the processor 320 to perform various actions. The memory 330 can include multiple different types of memory with different performance characteristics. It can be appreciated that the computing device 300 may include more than one processor and/or the computing device 300 may be included in a group or cluster of computing devices networked together to provide greater processing capability. The processor 320 can include any general purpose processor. Also, a hardware module or software module, such as module 1 (362), module 2 (364), and module 3 (366) stored in storage device 360 may be configured to control the processor 320 as well as a special-purpose processor where software instructions are incorporated into the actual processor design. The processor 320 may essentially be a completely self-contained computing system, containing multiple cores or processors, a bus, memory controller, cache, etc. A multi-core processor may be symmetric or asymmetric.

The system bus 310 may be any of several types of bus structures including a memory bus or memory controller, a peripheral bus, and a local bus using any of a variety of bus architectures. A basic input/output system (BIOS) stored in the ROM 340 or the like, may provide the basic routine that helps to transfer information between elements within the computing device 300, such as during start-up. The computing device 300 further includes a storage device 350 such as a hard disk drive, a magnetic disk drive, an optical disk drive, tape drive or the like. The storage device 360 can include software modules 362, 364, 366 for controlling the processor 320. Other hardware or software modules are contemplated. The storage device 360 is connected to the system bus 310 by a drive interface. The drive interface and the associated storage device 360 (e.g., computer readable storage media) provide nonvolatile storage of computer readable instructions, data structures, program modules and other data for the computing device 300. In one aspect, hardware modules described herein that perform particular functions may include a software component stored in a non-transitory computer-readable medium in connection with necessary hardware components, such as the processor 320, bus 310, output device 370, and so forth, to carry out the function. In addition to the storage device 360, other types of computer readable media which can store data that are accessible by a computer include magnetic cassettes, flash memory cards, digital versatile disks, cartridges, random access memories (RAMs), and read only memory (ROM). Non-transitory computer-readable storage media expressly exclude media such as energy, carrier streams, electromagnetic waves, and streams per se.

To enable user interaction with the computing device 300, an input device 390 represents any number of input mechanisms, such as a microphone for speech, a touch-sensitive screen for gesture or graphical input, keyboard, mouse, motion input, speech and so forth. An output device 370 can comprise one or more of a number of output mechanisms. In some instances, multimodal systems enable a user to provide multiple types of input to communicate with the computing device 300. A communications interface 380 generally governs and manages the user input and system output. There is no restriction on operating on any particular hardware arrangement and therefore the basic features here may be substituted for improved hardware or firmware arrangements as they are developed.

For clarity of explanation, the embodiment of FIG. 3 is presented as including individual functional blocks including functional blocks labeled as a "processor" or processor 320. The functions these blocks represent may be provided through the use of either shared or dedicated hardware, including, but not limited to, hardware capable of executing software and hardware, such as a special purpose processor, that is purpose-built to operate as an equivalent to software executing on a general purpose processor. For example the functions of one or more processors presented in FIG. 2 may be provided by a single shared processor or multiple processors. (Use of the term "processor" should not be construed to refer exclusively to hardware capable of executing software.) Illustrative embodiments may include microprocessor and/or digital stream processor (DSP) hardware, the read-only memory (ROM) 340 for storing software performing the operations discussed below, and the random access memory (RAM) 350 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The computing device 300 shown in FIG. 3 can practice all or part of the recited techniques, can be a part of the recited systems, can be the recited system, and/or can operate according to instructions in the recited non-transitory computer-readable storage media. Such logical operations can be implemented as modules configured to control the processor 320 to perform particular functions according to the programming of the module.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Embodiments of the disclosure may be practiced in network computing environments with many types of computer system configurations, including personal computers, handheld devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only, and should not be construed so as to limit the scope of the disclosure. Various modifications and changes can be made to the principles and embodiments described herein without departing from the scope of the disclosure and without departing from the claims which follow.

The invention claimed is:

1. A method, implemented at least in part by a processor, for facilitating synchronization of audio-video information, the method comprising:
   receiving, by a processor, audio-video information comprising a video stream and an audio stream;
   determining a region of motion in the video stream based on a property of the video stream;
   generating a video signal based on the determined region of motion;
   extrapolate an audio signal from the audio stream, wherein the extrapolated audio signal represents audio frequency changes within the audio stream;
   determining a relative delay between the streams based, at least in part, on comparing timing of peaks and troughs between the generated video signal and the extrapolated audio signal, respectively; and
   adjusting a delay value associated with one or both of the streams based on the determined relative delay.

2. The method of claim 1, wherein determining a relative delay between the streams based, at least in part, on comparing timing of peaks and troughs between the generated video signal and the extrapolated audio signal comprises:
   correlating the video signal and the audio signal.

3. The method of claim 2, wherein each of the video and audio streams includes one or more of:
   a compressed stream; and
   a decoded stream.

4. The method of claim 2, wherein the video signal is generated as a function of a property of the video stream and one or more timestamps associated with the video stream.

5. The method of claim 2, wherein the audio signal is generated as a function of a property of the audio stream and one or more timestamps associated with the audio stream.

6. The method of claim 2, wherein determining a region of motion in the video stream comprises:
   detecting a change in scene or subject matter of the video stream based on one or more motion vectors.

7. The method of claim 2, wherein the property of the audio stream comprises one or more density vectors.

8. The method of claim 2, wherein correlating the video signal and the audio signal includes mapping the video signal onto the audio signal.

9. A non-transitory computer readable storage medium storing instructions, the instructions comprising instructions for facilitating synchronization of audio-video information executable by a processor to:
   receive audio-video information comprising a video stream and an audio stream;
   determine a region of motion in the video stream based on a property of the video stream;
   generate a video signal based on the determined region of motion;
   extrapolate an audio signal from the audio stream, wherein the extrapolated audio signal represents audio frequency changes within the audio stream;
   determine a relative delay between the streams based, at least in part, on comparing timing of peaks and troughs between the generated video signal and the extrapolated audio signal, respectively; and
   adjust a delay value associated with one or both of the streams based on the determined relative delay.

10. The non-transitory computer readable storage medium of claim 9, wherein the instructions that are executable by the processor to determine a relative delay between the streams based, at least in part, on comparing timing of peaks and troughs between the generated video signal and the extrapolated audio signal comprise instructions that are executable by the processor to:
  correlate the video signal and the audio signal.

11. The non-transitory computer readable storage medium of claim 10, wherein each of the video and audio streams includes one or more of:
  a compressed stream; and
  a decoded stream.

12. The non-transitory computer readable storage medium of claim 10, wherein the video signal is generated as a function of a property of the video stream and one or more timestamps associated with the video stream.

13. The non-transitory computer readable storage medium of claim 10, wherein the audio signal is generated as a function of a property of the audio stream and one or more timestamps associated with the audio stream.

14. The non-transitory computer readable storage medium of claim 10, wherein the instructions that are executable by the processor to determine a region of motion in the video stream comprise instructions that are executable by the processor to:
  detect a change in scene or subject matter of the video stream based on one or more motion vectors.

15. The non-transitory computer readable storage medium of claim 10, wherein the property of the audio stream comprises one or more density vectors.

16. The non-transitory computer readable storage medium of claim 10, wherein the instructions that are executable by the processor to correlate the video signal and the audio signal include instructions that are executable by the processor to map the video signal onto the audio signal.

17. A videoconferencing system configured to facilitate synchronization of audio-video information, the videoconferencing system comprising:
  at least one processor;
  a memory, coupled to the processor, the memory storing instructions executable by the processor, the instructions comprising instructions to:
    receive audio-video information comprising a video stream and an audio stream;
    determine a region of motion in the video stream based on a property of the video stream;
    generate a video signal based on the determined region of motion;
    extrapolate an audio signal from the audio stream, wherein the extrapolated audio signal represents audio frequency changes within the audio stream;
    determine a relative delay between the streams based, at least in part, on comparing timing of peaks and troughs between the generated video signal and the extrapolated audio signal, respectively; and
    adjust a delay value associated with one or both of the streams based on the determined relative delay.

18. The videoconferencing system of claim 17, wherein the instructions to determine a relative delay between the streams based, at least in part, on comparing timing of peaks and troughs between the generated video signal and the extrapolated audio signal further comprise instructions to correlate the video signal and the audio signal.

19. The videoconferencing system of claim 18, wherein each of the video and audio streams includes one or more of:
  a compressed stream; and
  a decoded stream.

20. The videoconferencing system of claim 18, wherein the video signal is generated as a function of the property of the video stream and one or more timestamps associated with the video stream.

21. The videoconferencing system of claim 18, wherein the audio signal is generated as a function of a property of the audio stream and one or more timestamps associated with the audio stream.

22. The videoconferencing system of claim 18, wherein the instructions to determine a region of motion in the video stream further comprise instructions to detect a change in scene or subject matter of the video stream based on one or more motion vectors.

* * * * *

UNITED STATES PATENT AND TRADEMARK OFFICE
CERTIFICATE OF CORRECTION

PATENT NO. : 10,063,907 B1
APPLICATION NO. : 15/615717
DATED : August 28, 2018
INVENTOR(S) : James F. Darrah et al.

Page 1 of 1

It is certified that error appears in the above-identified patent and that said Letters Patent is hereby corrected as shown below:

In the Claims

Column 14, Line 11 in Claim 1: Replace the word "extrapolate" with the word --extrapolating--.

Signed and Sealed this
Thirtieth Day of October, 2018

Andrei Iancu
*Director of the United States Patent and Trademark Office*